United States Patent [19]

Drzewiecki

[11] 4,326,559
[45] Apr. 27, 1982

[54] FLUIDIC FORCE TRANSDUCER

[75] Inventor: Tadeusz M. Drzewiecki, Silver Spring, Md.

[73] Assignee: The United States of America as represented by the Secretary of the Army, Washington, D.C.

[21] Appl. No.: 143,698

[22] Filed: Apr. 25, 1980

[51] Int. Cl.³ .............................................. F15C 3/08
[52] U.S. Cl. .................................... 137/804; 73/515; 137/829; 137/831; 137/833
[58] Field of Search .................. 73/515; 137/804, 829, 137/831, 833

[56] References Cited

U.S. PATENT DOCUMENTS

| | | | |
|---|---|---|---|
| 3,187,762 | 6/1965 | Norwood | 137/831 |
| 3,201,999 | 8/1965 | Byrd |  |
| 3,468,331 | 9/1969 | O'Neal | 137/833 |
| 3,509,775 | 5/1970 | Evans | 73/515 |
| 3,556,119 | 1/1971 | Ankeney | 137/831 X |
| 3,557,816 | 1/1971 | Small | 137/804 |
| 3,613,709 | 10/1971 | Blaiklock | 137/831 |
| 3,971,257 | 7/1976 | Drzewiecki | 137/840 |

*Primary Examiner*—William R. Cline
*Attorney, Agent, or Firm*—Nathan Edelberg; Robert P. Gibson; Saul Elbaum

[57] ABSTRACT

A fluidic accelerometer and electromagnetic transducer formed from a plurality of vertical laminations having a nozzle, a pair of outlets for receiving nozzle fluid and a flexible member as an extension of one of the laminations which forms a vertical wall of said nozzle extending into a chamber between the nozzle and the outlets. The flexible member is responsive to acceleration or electromagnetic forces transverse the nozzle centerline to vary the proportion of nozzle fluid received by each outlet. The flexible member is separated from the horizontal walls of the chamber by a selected small distance to create sufficient viscous shear force to effectuate damping.

10 Claims, 3 Drawing Figures

FLUIDIC FORCE TRANSDUCER

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention relates generally to fluidic transducers and more specifically to fluidic linear accelerometers.

One type of linear accelerometer is disclosed in U.S. Pat. No. 3,971,257 as including a pair of output channels to receive a jet stream in equal proportions during non-acceleration. The acceleration forces divert the jet stream to change proportion of the amount of the fluid received by the pair of outputs. Although this type of device is acceptable for most applications, it is not sensitive enough to acceleration and is incapable of measuring electromagnetic forces. Another fluidic accelerometer includes a cantilevered mass which is more sensitive in response to acceleration forces to change the output of the accelerometer. This type of device is illustrated in U.S. Pat. No. 3,201,999.

Other uses of cantilevered beams have been in electro fluidic converters as illustrated in U.S. Pat. No. 3,187,762 wherein an electromagnet creates a magnetic force transverse to the position of the cantilever beam at the nozzle to direct the fluid to one of two outlets in a digital fashion. Similarly, a cantilever bi-metallic element has been used in a fluidic amplifier to convert temperature information into a fluidic output signal as illustrated in U.S. Pat. No. 3,557,816.

Another category of fluidic linear accelerometers generally include a moving part for example, a seismic mass which deflects a jet or produces a change in resistance, capacitance, etc. or simply produces a pressure, a wave, or a flow of some kind. The main problem with each of these devices is that the moving part must slide thus creating sliding friction and coulomb friction. The sliding friction produces noise and nonlinearity and the coulomb friction produces hysteresis, distortion and noise. The cantilever devices overcome the problems of the sliding members. One of the major problems of the cantilever accelerometers of the prior art is that they are generally digital and therefore not sensitive enough to produce a linear analog response. Similarly, they have a substantially high threshold deflection. If no damping means is provided in the fluidic device, the cantilever element will ring at the resonant frequency. Although acceptable in digital on/off type of devices, this is highly undesirable in an analog force transducer. Prior art devices have not addressed themselves to this problem specifically.

Fluidic force transducers of the prior art have been individually designed to have specific threshold deflections and frequency responses. Cumbersome and inaccurate adjustments of these devices were possible. Thus, there exists a need for a force transducer which can be readily adjusted or adapted for different response ranges and threshold forces.

SUMMARY OF THE INVENTION

An object of the present invention is to provide an improved fluidic force transducer of increased sensitivity.

Another object of the present invention is to provide a fluidic force transducer which has a linear response.

Still another object of the present invention is to provide a fluidic force transducer incorporating a cantilever beam which is critically dampened.

A still further object of the present invention is to provide a fluidic force transducer which is easily and accurately adjusted.

These and other objects are achieved by forming the fluidic transducer from a plurality of vertical laminations wherein the flexible or cantilever member is an extension of the lamination which forms the vertical wall of the nozzle. The flexible member extends from a fluid nozzle into a chamber which interconnects the fluid nozzle and a pair of fluid receiving outlets symmetrical about the nozzle axis or centerline. The flexible member is responsive to acceleration or electromagnetic forces transverse to the nozzle centerline to vary the proportion of nozzle fluid received by the outlets. The chamber includes an outlet section adjacent the outlets with a pair of exhaust ports on each side of the nozzle receiving fluid from said nozzle not received by the pair of outlets and a deflection section adjacent the nozzle having a length along the axis of the nozzle greater than the length of the flexible member. A pair of ports are provided in the deflection section on each side of the centerline. A vane means defines the outlet and deflection sections so as to retard recirculation of fluid from said outlet section toward said deflection section. To increase sensitivity, a mass is attached to the flexible member having a thickness greater than that of the laminations. The separation of the edges of the flexible member from the horizontal walls of said chamber is selected to be small enough to create a viscous shear force of the fluid between the horizontal walls of the chamber and said flexible member sufficient to effectuate critical damping of the flexible member. The characteristics of the force transducer are readily modified by merely replacing the lamination which includes the flexible member.

Other objects, advantages and novel features of the present invention will become apparent from the following detailed description of the invention when considered in conjunction with the accompanying drawings.

DESCRIPTION OF THE PREFERRED EMBODIMENTS

Figure 1:
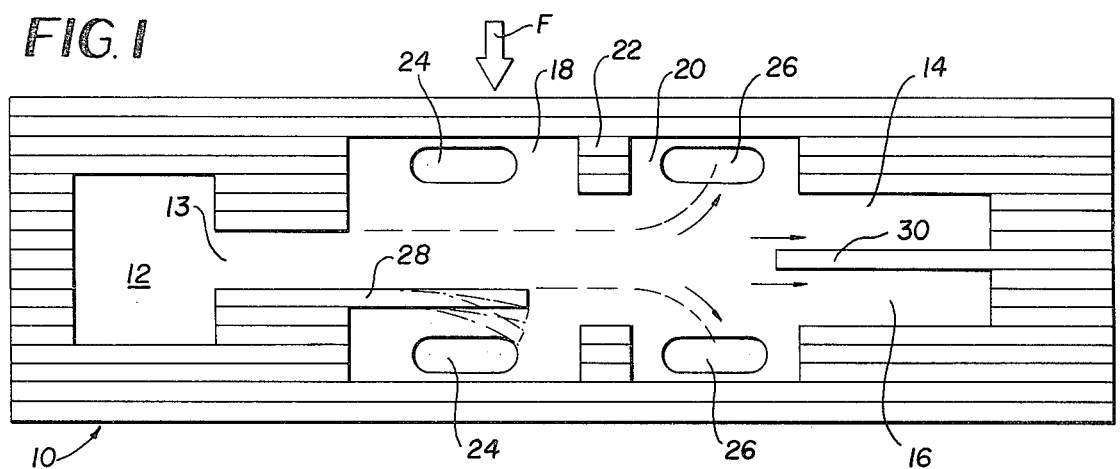
FIG. 1 is a top crossectional view of a fluidic transducer incorporating the principles of the present invention.

A fluidic transducer 10 is illustrated in FIG. 1 as including a fluid input plenum 12 having a nozzle 13. The fluid from the nozzle 13 is received by a pair of output channels 14 and 16. Interconnecting the nozzle 13 and the pair of output channels 14 and 16 are a deflection chamber 18 adjacent the nozzle 13 and outlet chamber 20 adjacent the outlet channels 14 and 16. The vane 22 separates deflection chamber 18 and output chamber 20 and retards recirculation of the fluid from the outlet chamber 20 toward the deflection chamber 18. Outlet chamber 20 includes a pair of vents or exhaust ports 26 on opposite sides of the centerline or axis of nozzle 13 and deflection chamber 18 includes a pair of vents or ports 24 on opposite sides of the axis of nozzle 13. Extending from one wall of nozzle 13 is a flexible or cantilever member 28. This flexible member 28 extends substantially the length of deflection chamber 18. The output channels 14 and 16 are divided by a splitter 30.

As illustrated in FIG. 1, the fluidic force transducer 10 is formed from a plurality of vertical laminations stacked parallel layers. The deflection chamber 18, outlet chamber 20, and outlet channels 14 and 16 are all symmetrical about the axis or centerline of the nozzle 13. The flexible member 28 is an extension of one of the vertical laminations which forms a vertical wall of the nozzle 13, the vertical laminations having edges which form perpendicular walls. Similarly, the output channel splitter 30 may be formed of one or more laminations which is symmetrical about the centerline or axis of nozzle 13.

The flexible member 28 is responsive to a force F transverse to the axis of the nozzle 13. This will cause the member 28 to flex as indicated in phantom in FIG. 1. In the nonflexed condition, the fluid under pressure from nozzle 13 traverses deflection chamber 18 and outlet chamber 20 and is received by the outlet channels 14 and 16. The laminar jet flow is proportioned between the outlet channels 14 and 16 with the remainder of the flow exiting vents 26 of outlet chamber 20. A specific proportion of fluid at the outlet channels 14 and 16 is measured and determined to be a null condition. By application of an acceleration force or electromagnetic force produced by an electromagnet, the flexible member 28 will flex, changing the characteristics of the deflection chamber. This will reproportion the fluid from nozzle 13 between the symmetrical pair of outlet channels 14 and 16.

The typical bending deflection of flexible member 28 can be defined by the simple cantilever equation of a uniformly distributed load such that:

$$\delta_{max} = wl^4/8EI$$

where δ—deflection
w—force per unit length
l—beam length
E—modulus of Elasticity (Young's Modulation)
I—moment of inertia of beam cross-section
where $$I = bd^3/12$$

b—beam height
d—beam width
For example $$w = pAa = ma/l$$

where p—density of beam

A—cross-sectional area of beam
m—mass of beam
a—acceleration
and the deflection at any point along the beam is $$\delta(x) = w/24EI(x^4 - 4l^3x + 3l^4)$$

and the slope at the end $$d\delta(x)/dx = wl^3/6EI$$

For small angles of deflection $d\delta(x)/dx = \tan \alpha \simeq \alpha$ therefore $$\alpha = wl^3/6EI = pAal^3/6EI.$$

As an example, for shim stock steel width d=0.1 mm, height b=0.5 m, length l=2 mm, the moment of inertia I=4×10$^{-5}$ mm$^4$ and E=2.1×10$^{11}$ kg/ms$^2$ and steel density is p=3.8×10$^4$ kg/m$^3$.

For a typical laminar amplifier a maximum jet angle at saturation occurs at 3° (0.05 radians) and conservatively for a dynamic range of 10$^4$, 5×10$^{-6}$ radians can be detected. The threshold acceleration sensed is $$a_{thresh} = (6EI/pAl^3)\alpha_{thresh}$$

For the sample dimensions given above, the threshold acceleration will be 16 m/sec$^2$.

Figure 2:
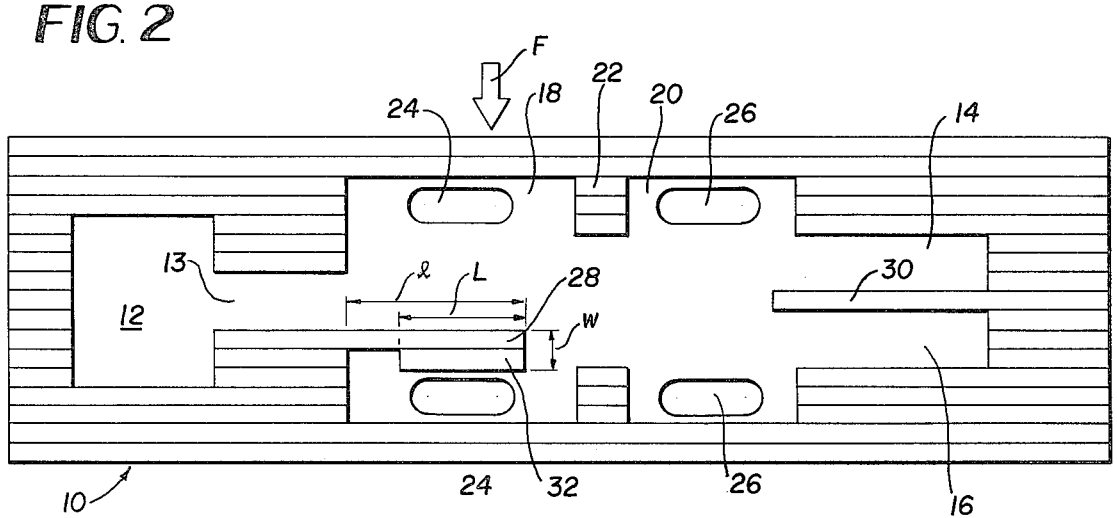
FIG. 2 is a crossectional top view of another fluidic transducer incorporating the principles of the present invention.

To increase the sensitivity of the force transducer 10, a weight 32 as illustrated in FIG. 2 is added to the flexible member 28. Weighting the beam by welding on a seismic mass on the end of the beam, the device would deflect more as follows:

$$\delta = (wl^4/8EI) + (Pl^3/3EI) = (l^3/EI)(wl/8 + P/3)$$

where P is the force of the weighted end $$P = p_oV_oa$$

where $v_o$ = volume of mass.

Now for a saturation deflection of 0.125 mm and a threshold deflection of 0.125×10$^{-4}$ mm $$a = \frac{\delta Ebd^3}{12l^3\left(\frac{pbdl}{8} + \frac{p_oV_o}{3}\right)}$$

let
$V_o = 0.5$ mm×0.5 = 125×10$^{-3}$ mm$^3$
$p = p_o = 3.8 \times 10$ kg/m$^3$
$E = 2.1 \times 10^{11}$ kg/ms$^2$
b=0.5 mm
d=0.1 mm
l=2 mm This results in a threshold acceleration of 7.5 m/sec$^2$ or slightly less than 1 g. Thus, the additional weight improves the sensitivity range. By reducing the width of the beam d to 0.05 mm and increasing the length l to 3 mm, the threshold acceleration drops to a threshold acceleration of 0.26 m/sec$^2$ or approximately 0.026 g. Thus, a very sensitive device is readily achieved.

The dynamic response of the fluidic transducer is limited only by the phase shift due to the transport delay and the dynamics of the output connections since the jet is directly driven by the flexible member 18. In a pneumatic operation, this may mean a response on the order of 1000 hertz. The structural resonance would limit the response of a device in that case. The resonant frequency of the device is defined by $$f = \frac{1}{2\pi \sqrt{m_o/k}}$$

where
$m_o = p_o V_o$, is the mass and
$k = $ spring constant $\sim 3EI/l^3$

For the system of FIG. 2, the frequency is approximately 4.098 kilohertz. For less sensitive devices, since the mass is so much lower and the spring constant is the same, the frequency is higher.

Figure 3:
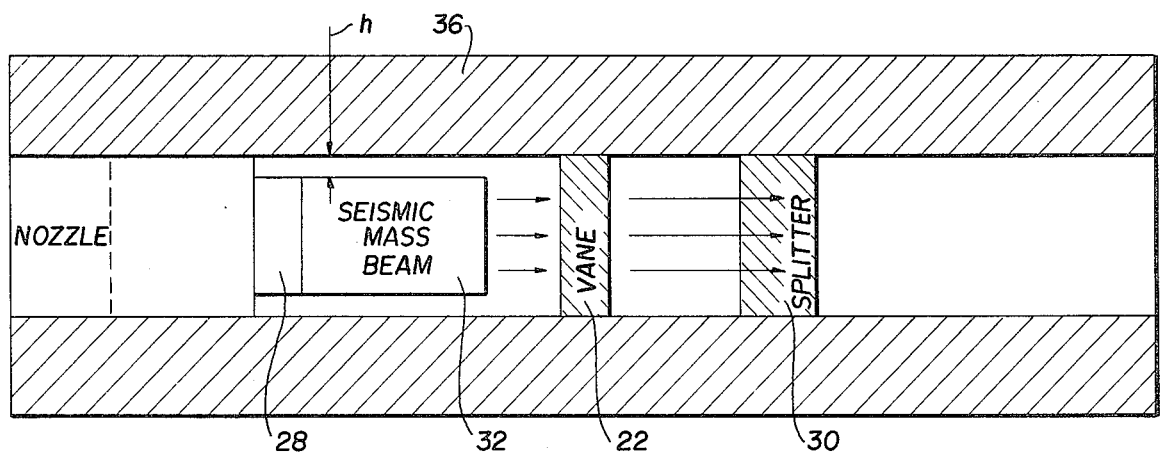
FIG. 3 is a crossectional side view of the fluidic transducer of FIG. 2.

If no damping were to occur, the system would ring at the resonant frequency, which has an undesirable effect. The present system is designed to have a sufficiently small clearance between the deflecting beam and the upper and lower bounding surfaces to effectuate damping. As illustrated in FIG. 3, upper and lower surfaces 34 and 36 define horizontal surfaces separated from the flexible member 28 by a distance h selected to create a viscous shear force sufficient to produce critical damping. The shear force on a moving mass is defined by $$\tau = \mu(\partial u/\partial y) = \mu(V/h)$$

Motion of the accelerometer mass is governed by the Newton's 2nd Law $\Sigma$Forces = mass $\times$ acceleration or $$(m d^2x/dt^2) + (D dx/dt) + bx = F(t)$$

where
m = mass
$d^2x/dt^2$ = lateral acceleration of center of mass $$D \frac{dx}{dt} = \text{Force applied due to viscous sheer}$$
$$= \tau \times \text{area}$$
$$= \frac{\mu w l}{h} \times V; D = \frac{\mu w l}{h}$$

v = lateral velocity = dx/dt
k = spring constant of cantilever beams
x = lateral displacement of mass m.
F(t) = applied load (acceleration field)
terms of damping, $\zeta$, and natural frequency, $\omega_n$ $$\ddot{X} + 2\zeta\omega_n \dot{X} + \omega_n X = F^1(t)$$

Therefore, $\zeta = D/2\sqrt{mk}$ and $w_n = \sqrt{k^1/m}$. To determine when system will not "ring" or overshoot when a force is applied, critical damping must be present or $$\zeta = 1$$

Thus, $1 = D/2\sqrt{mk} = \mu\omega l/2h\sqrt{mk}$ or $h = lwu/2\sqrt{mk}$

This fundamental relationship prescribes the spacing between the seismic mass of the beam and the bounding planes of the accelerometer as a function of: the geometry and constituency of the seismic mass cantilever beam; and the viscosity of the fluid medium which comprises the medium of the efficient jet. In oil for example, considerable damping can be achieved while in air the clearance would have to be quite small to obtain good damping. Height separation in the range of thousandths of an inch will produce desirable effects.

From the description of the preferred embodiments, it is evident that the objects of the invention are attained in that a fluidic force transducer is provided which is more sensitive than prior devices and includes critical dampening. Although the invention has been described and illustrated in detail, it is to be clearly understood that the same is by way of illustration and example only and is not to be taken by way of limitation.

I wish it to be understood that I do not desire to be limited to the exact details of constructions shown and described, for obvious modifications can be made by a person skilled in the art.

What is claimed is:

1. A fluidic force transducer comprising:
    a plurality of parallel stacked layers joined to form a transducer;
    a nozzle for issuing a fluid stream;
    a first and second outlet means symmetrical about the centerline of said nozzle for receiving fluid from said nozzle;
    a chamber symmetrical about said centerline of said nozzle interconnecting said nozzle and said first and second outlet means;
    a flexible member extending from said nozzle into said chamber parallel to the axis of said nozzle defining a barrier in said chamber which is responsive to forces transverse said nozzle axis to vary the portions of fluid received by said first and second outlet means;
    one of said stacked layers which forms one wall of said nozzle includes said flexible member as an extension of said wall.
    and wherein the edges of said flexible member are separated from at least one wall of said chamber by a distance small enough to create a viscous shear force of the fluid between said chamber wall and said flexible member sufficient to effectuate critical damping of said flexible member.

2. A fluidic force transducer according to claim 1 wherein said flexible member includes a first portion having a thickness equal to the thickness of its layers adjacent the nozzle and a second portion adjacent the extended end having a thickness substantially greater than said first portion.

3. A fluidic force transducer according to claim 2 wherein said second portion of said flexible member includes a mass mounted to an extension of said first portion.

4. A fluidic force transducer according to claim 1 wherein said first and second outlet means are divided by a portion of at least one of said parallel layers on the centerline of said nozzle.

5. A fluidic force transducer according to claim 1, wherein said chamber includes:
    an outlet section adjacent said first and second outlet means with a pair of vents, one on each side of the nozzle's centerline for exhausting fluid from said nozzle not received by said first and second outlet means; and
    a deflection section adjacent said nozzle having a length along said axis greater than the length of said flexible member.

6. A fluidic force transducer according to claim 5 wherein said outlet and deflection sections of said chamber are divided by vane means for retarding recirculation of fluid from said outlet section toward said deflection section.

7. A fluidic force transducer according to claim 6 wherein the separation of said flexible member from the edge of the stacked layers defining walls of said chamber is in the order of $10^{-3}$ inches.

8. A fluidic force transducer according to claim 6 wherein said deflection section of said chamber includes a pair of ports, one on each side of the nozzle's centerline.

9. A fluidic force transducer according to claim 2 wherein said transducer measures acceleration forces transverse to said nozzle's centerline.

10. A fluidic force transducer according to claim 1, including means for creating an electromagnet force transverse to said nozzle's centerline and said transducer measures said electromagnetic force.

* * * * *